MONOPULSE RECEIVING SYSTEM

Filed Dec. 27, 1966

INVENTOR
WALTER D. TRIPPE

United States Patent Office 3,566,407

Patented Feb. 23, 1971

3,566,407

MONOPULSE RECEIVING SYSTEM

Walter D. Trippe, Orlando, Fla., assignor to Martin-Marietta Corporation, New York, N.Y., a corporation of Maryland Continuation-in-part of application Ser. No. 471,523, July 13, 1965. This application Dec. 27, 1966, Ser. No. 604,756

Int. Cl. G01s 9/22

U.S. Cl. 343—16 9 Claims

ABSTRACT OF THE DISCLOSURE

A single channel time multiplexing monopulse receiving system providing a direct undelayed channel normally open through to the intermediate frequency amplifier, and control means responsive to a signal from the direct channel, as delivered by the amplifier, to terminate its transmission to the amplifier input, and for a time period to connect the delayed signal channel to the input of the intermediate frequency amplifier.

CROSS-REFERENCE TO RELATED APPLICATION

This is a continuation-in-part of patent application Ser. No. 471,523 filed July 13, 1965, by William O. Purcell and Walter D. Trippe, for "Angularly Selective Monopulse Reception." The referenced application illustrates the incorporation of the present invention in a complex monopulse receiving system.

BACKGROUND OF THE INVENTION

(1) Field of the invention

The invention pertains to the field of monopulse radio reception, in which plural antenna means are employed to obtain information relative to the incident direction of the received radiation by angular discrimination. In particular, the invention relates to time multiplexing monopulse systems dealing with signals of limited duration, or pulses.

(2) Description of the prior art

Time multiplexing monopulse receivers are of recognized utility in permitting the use of a single intermediate frequency amplifier system, and thus avoid the stringent physical prerequisites encountered in dual I.F. channel systems which demand practically identical characteristics in the separate intermediate frequency amplifiers. Such time multiplexing systems usually provide, as successive signal trains to the intermediate amplifier, the sum signal followed by the combined sum-and-difference signal. These signals are successively introduced through mixing circuitry to the intermediate frequency amplifier.

Prior art systems of the type described are subject to serious limitations. Their internal thermal noise level is high, the effective noise bandwidth being several times the radiation signal bandwidth. In representative systems, the noise bandwidth is three times the signal bandwidth, since the summing circuitry constantly receives the effective input of three channels: the undelayed sum noise band, the delayed sum noise band, and the delayed difference noise band.

Prior applications of time multiplexing have also suffered from simultaneous application to the intermediate frequency channel from the mixing circuitry of overlapping portions of delayed and undelayed signal components that occur when the duration of the input signal is greater than the multiplexing time delay provided. Under other circumstances, where the mixing circuitry is continuously effective to deliver both the sum and the sum-and-difference signals to the intermediate frequency amplifier, it is possible to activate the utilization networks fed by the intermediate amplifier when the sum signal drops below a threshold level, but the sum-and-difference signal remains of substantial amplitude. In these situations, the monopulse receiver system will produce an erroneous output.

The present invention is directed to the problem of significantly improving the broad effective noise bandwidth of prior art monopulse systems, and preventing overlapping of portions of the delayed and undelayed signals, as well as prevention of sense reversal resulting from undelayed sum signal drop-out.

SUMMARY OF THE INVENTION

The present invention provides, in time multiplexing monopulse systems, switching circuitry sequentially operative to assure that only one input signal channel is effectively connected to feed its signal to the intermediate frequency amplifier at any time. The switching circuitry is normally operative to transmit the undelayed signal to the intermediate frequency amplifier, and unless this signal is of useful amplitude, or at least above threshold level, the delayed signal is not applied to the intermediate frequency amplifier. Sense reveral is thus prevented. If, however, a satisfactory undelayed signal is applied to the intermediate frequency amplifier, control circuitry responsive thereto subsequently activates the switching circuitry to effectively disconnect the undelayed signal channel from the input of the intermediate frequency amplifier and connect the delayed signal channel thereto for application of that signal. After a predetermined timing period, during which the delayed signal is amplified and transmitted to the processing video circuitry, the control network resets the switching circuitry to its initial condition.

Accordingly, the system avoids simultaneous presence of delayed and undelayed signal components in the intermediate amplifier, despite the fact that such signal trains may substantially exceed the desired range of pulse lengths for which the receiver was designed.

Where the intermediate frequency amplifier is thus provided with input switching, the respective undelayed and delayed signal components are not degraded by the additive noise components of the other receiver channel. Thus, in the present system, an undelaying sum signal will be applied to the intermediate frequency amplifier without the tripled thermal noise level with which it was previously degraded by simultaneous application to the amplifier of the delayed sum and difference channels. Correspondingly, in the present system, the delayed sum-and-difference signal is not degraded by the additive combination therewith of noise from the undelayed sum channel.

Accordingly, it is the object of the present invention to provide a highly efficient time multiplexing monopulse receiving system of improved effective noise bandwidth, free of simultaneous overlapping signal portions, and sense reversal resulting from undelayed signal drop-out. Other objects and advantages of the invention will appear in the detailed description below.

BRIEF DESCRIPTION OF THE DRAWINGS

A preferred embodiment of the present invention is shown in the drawings in which.

DESCRIPTION OF THE PREFERRED EMBODIMENT

Figures 1, 2, 3:
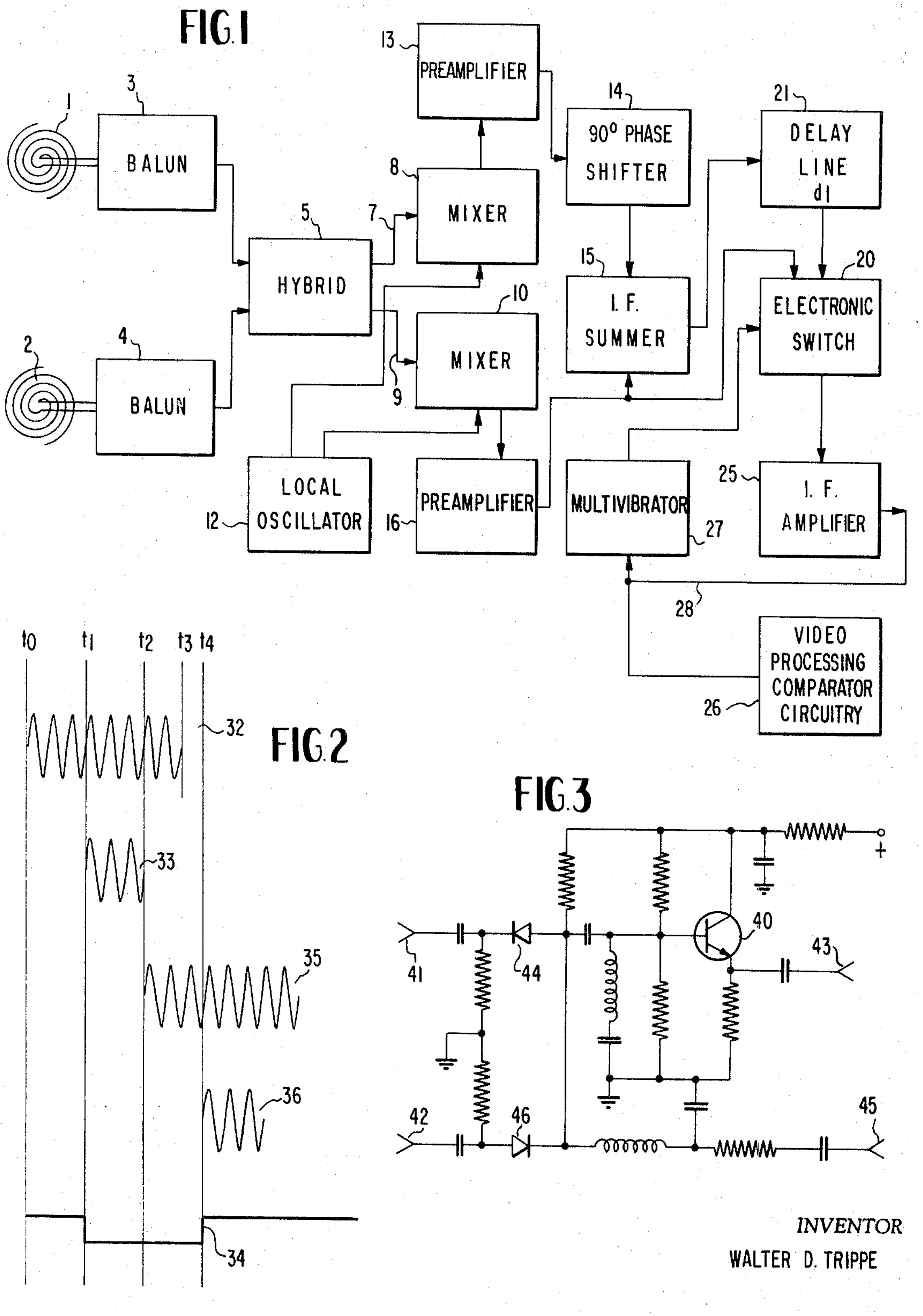
FIG. 1 shows a block diagram of a monopulse receiving system of the present invention.
FIG. 2 shows illustrative waveforms present in operation of the system.
FIG. 3 shows switching circuitry for use in the system of FIG. 1.

The present invention may be applied generally to conventional prior art time multiplexing monopulse receiver systems. A typical embodiment is shown in FIG. 1. The respective antennas 1 and 2 are fed through baluns 3 and 4 to radio frequency hybrid 5. Hybrid 5 supplies the difference signal through line 7 to mixer 8 and the sum signal through line 9 to mixer 10. Local oscillator 12 supplies its output to mixers 8 and 10 to effect the desired frequency conversion.

In the system disclosed, the difference signal at intermediate frequency is applied to the intermediate frequency summer 15 through preamplifier 13 and a 90° phase shifter, 14.

The sum signal from mixer 10 is applied at intermediate frequency through preamplifier 16 to electronic switch 20, as well as to the intermediate frequency summer 15. The combined signal from summer 15 is retarded a desired amount in delay line 21, whence the delayed signal is applied to the other input of electronic switch 20.

Electronic switch 20 controls the input channel to which the intermediate frequency amplifier 25 of the monopulse system is connected. The output of amplifier 25 is applied to the input of the video processing comparator circuitry 26. This video processor incorporates the necessary components for deriving desired angular information with respect to the direction of the incidence of the received radiation pulses at antennas 1 and 2. The network 26 may consequently incorporate one of the many networks known for such purposes.

The present invention particularly involves the operation of electronic switch 20, whose operation is programmed according to signals applied from control circuitry which in turn is responsive to the undelayed signal from mixer 10 and preamplifier 16. In the present embodiment, the control circuitry comprises multivibrator 27, a monostable network which, in response to an input keying signal, generates a single control pulse of desired duration, and then reverts to its stable condition.

The trigger signal for operating multivibrator 27, in the present embodiment, is received from the output channel of intermediate frequency amplifier 25. For the purposes of the present invention, the input of amplifier 25 is normally connected through electronic switch 20 to the transmission channel supplying the undelayed (sum) signal which, in the present instance, is delivered by preamplifier 16. Consequently, when an incident radiation pulse is received at antennas 1 and 2, the intermediate frequency analog of the sum of such signals is directly applied, after the known inherent transmission delay, to the input of amplifier 25. In the present network, the delay time of amplifier 25 provides an initial gating control period. At the end of this period, electronic switch 20 is operated to terminate transmission from the undelayed direct channel. Simultaneously, the channel supplying the delayed signal is connected through switch 20 to the intermediate frequency amplifier 25.

The output channel from amplifier 25 is connected to supply a trigger signal to multivibrator 27 at the desired time delay. In the event that the inherent time delay developed in the passage of the intermediate frequency signal through amplifier 25 is insufficient for a specific design objective, line 28, connecting amplifier 25 to multivibrator 27, may incorporate a further delay component. The latter may be constructed in accordance with conventional design considerations, such as applied in connection with the design of delay line 21.

When multivibrator 27 receives the input trigger signal from amplifier 25, it enters its active unstable condition to supply a switching control signal of desired duration to electronic switch 20.

Under application of the control signal from multivibrator 27, electronic switch 20 disconnects the input of intermediate frequency amplifier 25 from the direct transmission channel, including preamplifier 16 supplying the direct and undelayed (sum) signal, and connects the input of amplifier 25 to the transmission channel through which the delayed signal is passed. The latter includes delay line 21 receiving its input from intermediate frequency summer 15, which combines the sum-and-difference signals received from preamplifiers 16 and 13, respectively.

As is well known in the art, monostable multivibrators, such as 27, effect transition to the unstable phase only in response to triggering voltages at or above a predetermined magnitude. Multivibrator 27 is designed to respond at a minimum triggering voltage amplitude selected as the output to which intermediate frequency amplifier 25 is driven by the desired or inherent threshold level of the undelayed sum signal to which the overall system is designed to respond. If the sum signal derived at the input of amplifier 25 from the incidence of any particular radiation pulse at antennas 1 and 2 is insufficient for the desired operation of video processing comparator circuitry 26, such pulse will not be responded to by multivibrator 27. As described above, this safeguard avoids sense reversal where the delayed signal, thus rejected, would otherwise erroneously activate the direction sensing networks 26.

The operation of the system of FIG. 1 may be further explained with regard to the time durations of the various waveforms shown in FIG. 2. Waveform 32 shows an intermediate frequency wave train of the undelayed signal at the output of preamplifier 16. The wave train begins at time $t_0$ and in the present illustration, persists for longer than desired duration until time $t_3$. This signal is directly applied through normally conductive switch 20 to amplifier 25. Under the finite transmission time $t_1$ of this amplifier, its output develops waveform 33, beginning at time $t_1$. In the example described, the signal 33 immediately exceeds the triggering response threshold of multivibrator 27, and the latter immediately generates the output waveform shown at 34 to trigger switch 20. Consequenly, at the desired delay time $t_1$, determined by the transmission line for the immediate frequency signal through amplifier 25, and if desired, by other delay components in line 28, switch 20 is operated by waveform 34 to disconnect the direct undelayed signal channel from the input of amplifier 25, so that only the portion of wave train 32 shown at 33, as amplified by transmitter 35, is delivered to the video processor 26.

As the input of amplifier 25 is switched from preamplifier 16 to delay line 21, the circuitry becomes responsive to signals which may appear in the delayed channel. Delayed wave train 35 illustrates the combined signal supplied by delay line 21 from intermediate frequency summer 15. This signal begins at time $t_2$ as primarily determined by delay line 21, and is delivered to the video processor 26, beginning at time $t_4$, a delay of the period $t_1$ after time $t_2$. The delayed waveform is shown at 36.

The duration of delayed combined signal 36 is limited by the duration of control voltage 34 applied to electronic switch 20 from multivibrator 27. In the present illustration, the termination of this control voltage is selected to occur at a point after the terminaion of any expected incident pulse length, such as shown at 32. The system then reverts to the initial condition for the reception of a subsequent radiated pulse signal.

As may be seen, in the example shown in FIG. 2, the duration of wave train 32 exceeds the desired limits with respect to the delay $t_2$, determined essentially by delay line 21. Whereas signals of such duration, if applied to conventional time multiplexing monopulse receivers having similar delay times, would result in the application of overlapping signals to the video processor circuitry, the switching arrangement of the present invention eliminates this possibility.

The circuit of FIG. 3 comprises a network suitable to perform the functions of electronic switch 20. FIG. 3 broadly comprises a single-stage amplifier employing transistor 40 which connects either of two input channels 41 and 42 to output channel 43. The latter feeds the input of intermediate frequency amplifier 25. In the circuit as shown, diode 44 is normally conductive, and input 41 is normally operative to transmit signals from preamplifier 16 through diode 44 to the intermediate frequency amplifier 25. Under application of the negative control voltage from multivibrator 27, as shown at 34 in FIG. 2, to control input 45 of the electronic switch, diode 44 becomes nonconductive under reverse bias, and diode 46 effectively connects input 42 to the base of transistor 40. Input 42 is connected to the output of delay line 21, and during the persistence of waveform 34 the delayed signal transmission channel is effectively connected to the input of intermediate frequency amplifier 25 for delivery of the combined signal 36. The switching circuitry shown in FIG. 3 may be considered illustrative of a wide variety known in the art which may be employed in the invention.

The time delays employed in a monopulse receiver system of the present invention will be selected in accordance with the duration of the pulse signals on which it is expected to operate. In a particular embodiment, the delay time $t_2$ imposed by delay line 21 was 2 microseconds, the transmission delay inherent in intermediate frequency amplifier 25 was on the order of 1 microsecond, and the control signal 34 generated by multivibrator 27 was substantially 2 microseconds.

In the usual application of the present invention, due to the above-described diminution in the effective internal thermal noise bandwidth of the receiver the noise reduction in the direct channel operation by the factor of three improves the receiver sensitivity by 4.8 db, thus increasing the maximum range of the receiver by 74 percent. This applies to the receiver system shown in FIG. 1, utilizing single-plane sensing. In systems providing dual-plane sensing, application of the present invention improves the sensitivity 7 db and increases the maximum range at which the receiver will operate by 124 percent. Substitution of electronic switch 20 and its control circuits for a conventional intermediate frequency summer in the pre-existing receiver gave slightly better than theoretical improvement, because the insertion loss of the switching network shown in FIG. 3 was less than that of the summer for which it was substituted.

While the invention has been described in connection with a specific time duplexing monopulse receiving system, it will be understood that the scope of the invention is to be determined with respect to the scope of the appended claims.

I claim:

1. A time multiplexing monopulse receiving system comprising:

radio frequency circuitry operative to convert the incidence of a single radio frequency radiation pulse into first and second related signals, with the second of said signals being delayed with respect to the time of occurrence of the leading edge of the first of said signals, and which said second signal may occur after the termination of said incidence pulse, first and second channel means for supplying said first and second signals, respectively, output channel means for sequentially processing said signals, switch means normally coupling said first channel means to said output channel means, and control means for said switch means being operative responsively to the presence of the first signal in said output channel means to cause said switch means to decouple said first channel means from said output channel means and couple the second channel means to said output channel means, and becoming operative thereafter to cause said switch means to decouple said second channel means and recouple said first channel means to said output channel means.

2. The system of claim 1 wherein the radio frequency circuitry comprises means supplying a sum signal and a sum-and-difference signal as the first and second signals.

3. The system of claim 2 further including means for supplying the sum-and-difference signal to the means for delaying one of said signals.

4. The system of claim 3 wherein the output channel means comprises an intermediate frequency amplifier.

5. The system of claim 4 wherein the output channel means further comprises comparator circuitry fed by the intermediate frequency amplifier.

6. The system of claim 5 wherein the control means comprises a monostable pulse generator.

7. The system of claim 6 wherein the monstable pulse generator comprises means responsive to the output of the intermediate frequency amplifier produced by the other signal.

8. The system of claim 7 wherein the monostable pulse generator comprises means responsive to outputs of the intermediate frequency amplifier only above a predetermined magnitude produced by the other signal.

9. A time multiplexing monopulse receiving system comprising:

a pair of spaced receiving means, radio frequency circuitry operative to supply first and second signals responsively to incidence of a single radio frequency radiation pulse upon said pair of receiving means, first and second channel means for supplying the first and second signals, respectively, each of said channel means having mixer means therein, and with said second channel means having delay means therein so that said second signal will be delayed with respect to said first signal, output channel means for sequentially processing said signals, switch means normally coupling said first channel means to said output channel means, and control means for said switch means being operative responsively to the presence of the first signal in said output channel means to cause said switch means to decouple said first channel means from said output channel means and couple said second channel means to said output channel means so that the delayed signal can pass to said output channel means, and becoming operative thereafter to cause said switch means to decouple said second channel means and recouple said first channel means to said output channel means.

References Cited

UNITED STATES PATENTS

| | | | |
|---|---|---|---|
| 3,128,461 | 4/1964 | Case, Jr. | 343—16 |
| 3,141,164 | 7/1964 | Holcomb et al. | 343—16 |
| 3,175,215 | 3/1965 | Blasberg et al. | 343—16 |

RODNEY D. BENNETT, Jr., Primary Examiner

M. F. HUBLER, Assistant Examiner